United States Patent
Gitlin et al.

(10) Patent No.: US 6,757,841 B1
(45) Date of Patent: Jun. 29, 2004

(54) METHOD AND APPARATUS FOR DYNAMIC MIRRORING AVAILABILITY IN A NETWORK APPLIANCE

(75) Inventors: Jonathan Gitlin, Hillsboro, OR (US); Kevin W. Bross, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 09/662,100

(22) Filed: Sep. 14, 2000

(51) Int. Cl.[7] .............................................. G06F 11/00
(52) U.S. Cl. ......................................... 714/7; 711/134
(58) Field of Search ........................... 714/7, 6, 13, 15, 714/42, 43, 48, 54; 711/114, 133, 134, 159

(56) References Cited

U.S. PATENT DOCUMENTS

| | | | | |
|---|---|---|---|---|
| 5,440,716 A | * | 8/1995 | Schultz et al. | 711/114 |
| 5,479,653 A | * | 12/1995 | Jones | 714/5 |
| 5,611,069 A | * | 3/1997 | Matoba | 711/114 |
| 5,799,141 A | * | 8/1998 | Galipeau et al. | 714/13 |
| 6,167,531 A | * | 12/2000 | Sliwinski | 714/13 |
| 6,308,283 B1 | * | 10/2001 | Galipeau et al. | 714/6 |
| 6,330,653 B1 | * | 12/2001 | Murray et al. | 711/173 |
| 6,442,709 B1 | * | 8/2002 | Beal et al. | 714/33 |
| 6,484,235 B1 | * | 11/2002 | Horst et al. | 711/114 |

* cited by examiner

Primary Examiner—Nadeem Iqbal
(74) Attorney, Agent, or Firm—Blakely, Sokoloff, Taylor & Zafman LLP

(57) ABSTRACT

Dynamic switching between mirrored and non-mirrored implementations is provided by formatting a system to operate in a simulated mirrored mode. A null location is used as a placeholder for a storage location that can be subsequently added. The null location is replaced in whole or in part by the storage location when actual mirrored node is desired, thereby making the switch to actual mirrored mode appear dynamic and transparent to a user. A first location is designated as a first part of a mirror, and the null location is designated to simulate a second part of the mirror. Data and/or operating systems may be mirrored.

25 Claims, 4 Drawing Sheets

METHOD AND APPARATUS FOR DYNAMIC MIRRORING AVAILABILITY IN A NETWORK APPLIANCE

BACKGROUND OF THE INVENTION

1. Field of the Invention

The present invention relates to mirroring, and in particular relates to dynamically switching between mirrored and non-mirrored implementations in a network appliance, such as a network server.

2. Background Information

Fault tolerance is important in many systems, particular for servers. One method of providing fault tolerance is to use a Redundant Array of Independent Disks (RAID). For example, a system using RAID 1 writes data simultaneously to two duplicate disk drives. This way, if one of the disk drives fail, the system can instantly switch to using the other disk drive without any loss of data or service.

There are, however, disadvantages associated with using current mirroring methods, particularly with switching between non-mirrored and mirrored implementations. Setting up a standalone drive for mirroring is a lengthy, tedious, and costly process. First, a user installs a second drive and formats it for mirroring mode. Second, all the system files and data from the first drive are copied to the second drive. Third, the system is switched over to using the second drive instead of the first drive, which may include subsequently rebooting the system. Fourth, the first drive is reformatted from standalone mode to mirroring mode. Fifth, the mirror is activated and data is allowed to propagate from the second drive to the first drive for mirror synchronization. Finally, data can be written simultaneously to both drives.

If a user decides to opt for more storage rather than redundancy provided by mirroring, the process of switching from mirroring mode back to standalone mode is similarly tedious. First, the mirror is deactivated. Second, the system is switched over to operate off of the second drive. Third, the first drive is reformatted for standalone mode. Fourth, all the system files and data from the second drive are copied to the first drive. Fifth, the system is switched to using the first drive in standalone mode. Sixth, the second drive is reformatted for standalone mode. Finally, the second drive can be added into the system for additional storage.

Therefore, it is clear that existing methods to format a system for mirroring and to switch the system between mirrored and non-mirrored implementations are inconvenient and complicated.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method and apparatus for dynamic mirroring availability in a network appliance, such as a network server, are described in detail herein. In the following description, numerous specific details are provided, such as using the mirroring method in a Linux environment, for illustrative purposes and to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention provide a system and method for dynamic switching between mirrored and non-mirrored implementations by formatting a system to always operate as if it is in mirrored mode. The mirrored mode uses a first location, such as a disk drive, as a first part of a mirror and a null location, such as a null drive, as a second part of a mirror. The null location reserves a slot for another disk drive that can be added to the mirror if actual mirroring is desired. In an embodiment of the invention, a software mechanism implements the switching between mirrored and non-mirrored modes.

Figure 1:
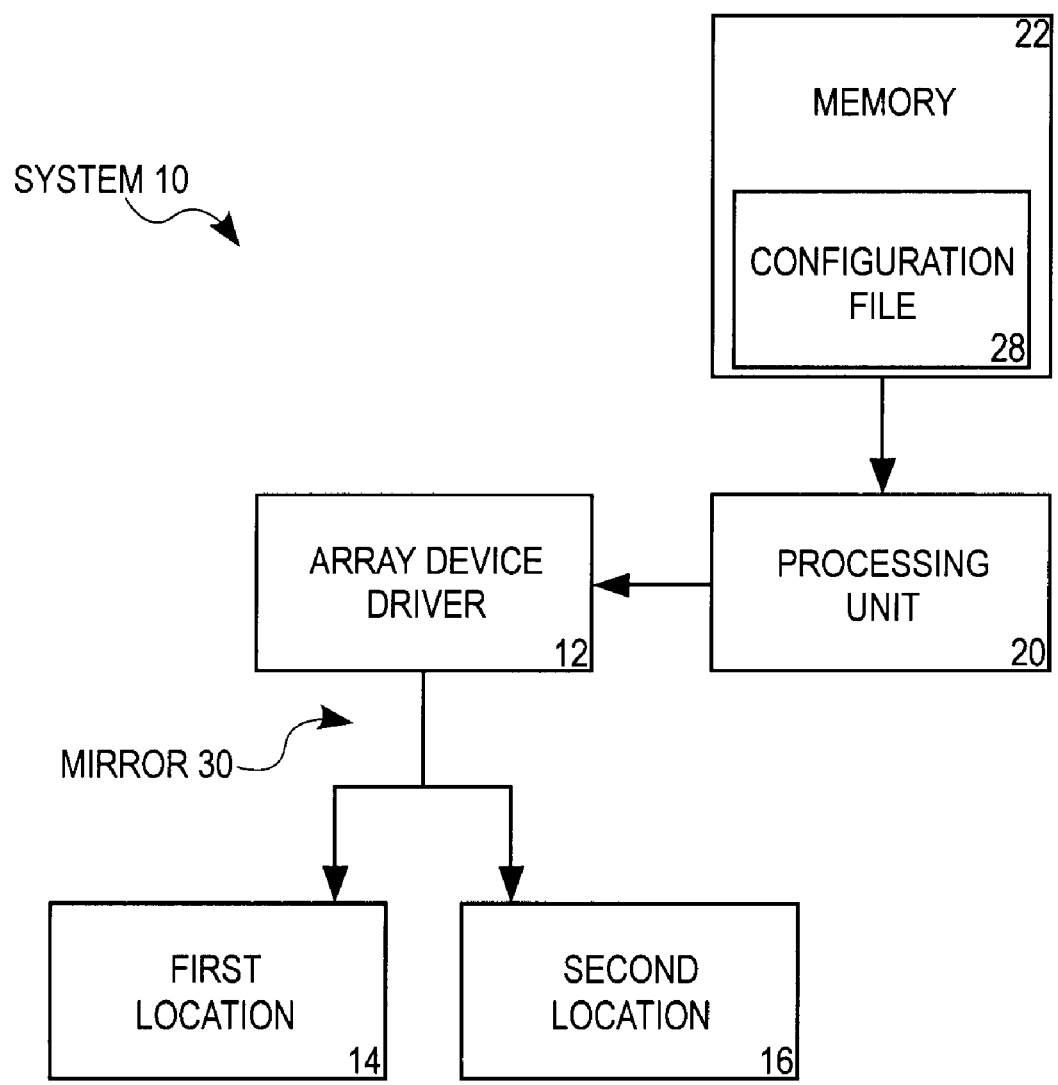
FIG. 1 is a block diagram showing components of an embodiment of a system that implements a dynamic mirroring method.

Referring first to FIG. 1, components of a system 10 that implements an embodiment of the present invention are shown. Those of ordinary skill in the art will appreciate that the system 10 may include more components than those shown in FIG. 1. However, it is not necessary that all of these generally conventional components be shown in order to disclose an illustrative embodiment for practicing the present invention. As shown in FIG. 1, the system 10 includes an array device driver 12, a processing unit 20, a memory 22, and a mirror 30. The mirror 30 comprises two parts: a first location 14 and a second location 16.

The memory 22 generally includes a random access memory (RAM) and a permanent mass storage device, such as a hard disk drive, tape drive, optical drive, floppy disk drive, etc., or a combination thereof. The memory 22 stores program code, instructions, and data to implement an embodiment of the mirroring method of the present invention. The memory 22 also stores a file, such as a configuration file 28, a registry, or other component that contains information to format or configure the array device driver 12.

As will be appreciated by those skilled in the art, the instructions for implementing an embodiment of the mirroring method of the present invention may be provided by any machine-readable media which can store data that is accessible by system 10, as part of or in addition to the memory 22, including but not limited to cartridges, magnetic cassettes, flash memory cards, digital video disks, RAMs, read-only memories (ROMs), and the like. In this regard, the system 10 is equipped to communicate with such machine-readable media in a manner well known in the art.

It will be further appreciated by those skilled in the art that the instructions for implementing an embodiment of the mirroring method of the present invention may be provided to the system 10 from any external device capable of storing the instructions and communicating the instructions to the system 10. For example, in one embodiment, the system 10 may be connected to a network, and the instructions may be stored on any device in the network.

In accordance with one embodiment of the present invention, the array device driver 12 receives a read or write request. The request may be sent from an operating system. In one embodiment, the request can be sent from a Linux kernel, and it is to be appreciated that the request can be sent from other types of operating systems, such as UNIX or Windows. The request is propagated from the array device driver 12 to the mirror 30. Duplicate data may then be written and stored in both the first location 14 and the second location 16.

In an embodiment of the present invention, the first location 14 may comprise a first storage location. In one embodiment, the first location 14 comprises a first disk drive. In another embodiment, the first location 14 may include an operating system. When a user prefers not to have duplication (e.g., the system 10 simulates a mirror but data is not actually mirrored in the normal sense), the second location 16 comprises a null location. In one embodiment, the null location is a null drive. One example implementation of a null drive is to use the /dev/null device, also known as the "bit bucket," in Linux.

The null location acts like a placeholder for a second storage location, such as a second disk drive, that may be subsequently added. Requests and data from the array device driver 12 may still propagate to both parts of the mirror 30, but no data may actually be written to or read from the null location. Hence, there is no duplicity. Using the null location as the second part of the mirror 30 allows the system 10 to always operate as if it is in mirrored mode, even when there is only one storage location. This allows the second location 16 to be easily changed when the user wants duplication. For example, when the user wants to add a second disk drive for mirroring, there is no need to reformat the system 10 or the first disk drive for mirroring. Instead, the null location is replaced, in whole or in part, by the second disk drive. In this manner, a form of dynamic mirroring is provided, since additional disk drive(s) may be added to the system 10 without the tedious formatting of the prior art.

As mentioned, when a user prefers duplicity, the second location 16 may be a second storage location, such as a second disk drive. In another embodiment, the second location 16 may include an operating system. In operation, when there are two storage locations, read and write requests may be propagated from the array device driver 12 and data may be written to and read from both locations 14 and 16. Since there is duplicate data, if there is a problem with one of the locations, data may be read from the other location without any slowdown or failure to the system 10.

In an embodiment of the present invention, the first location 14 stores a first operating system and the second location 16 stores a second operating system. Therefore, the mirror 30 operates to provide duplicate operating systems. When there is a problem with one operating system, the system may boot using the other operating system without any delay or failure to the system 10.

In another embodiment of the present invention, the system 10 may comprise N number of mirrors. In this embodiment, there may be one storage location and N−1 null locations. In another embodiment, there may be M null locations, where M comprises a number between 0 and N, non-inclusive. The null locations may be thought of as placeholders for potential additional storage locations that may be added subsequently into the system 10. In addition to having N number of data mirrors, the system 10 may further comprise one or more mirrors for duplicating operating systems. That is, both data mirrors and mirrored operating systems may be provided in the embodiment.

Figure 2:
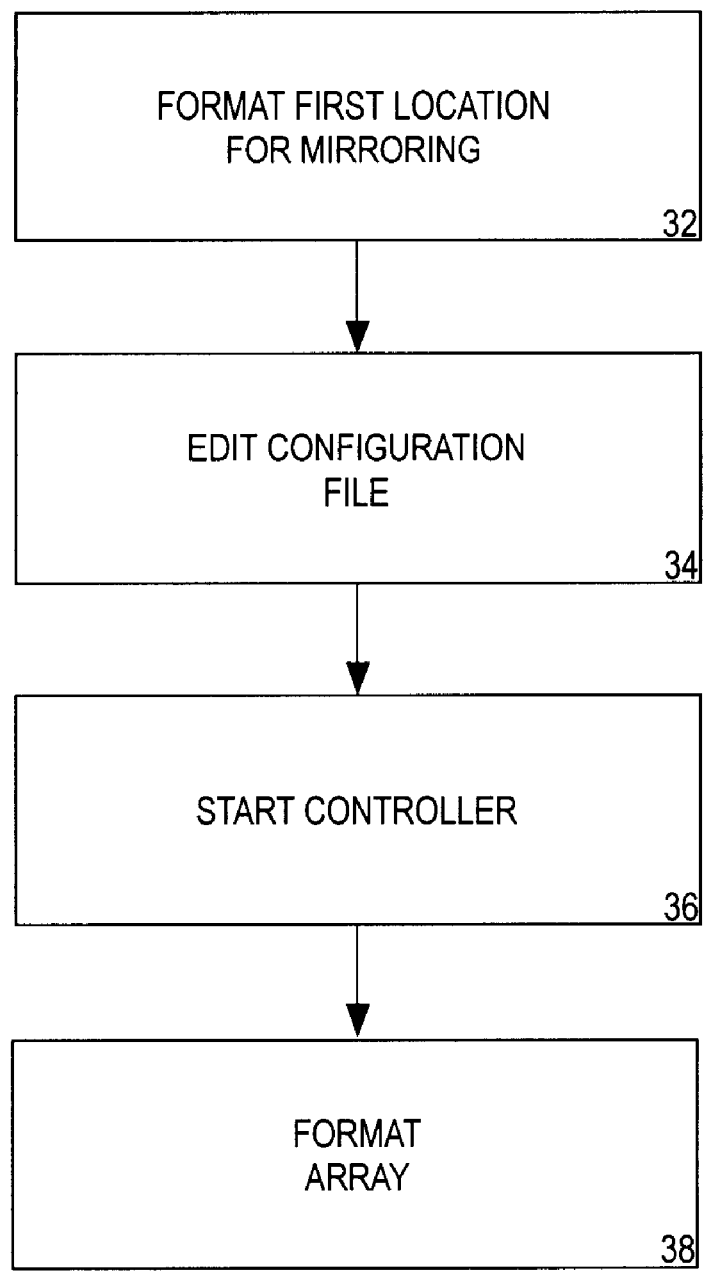
FIG. 2 is a flow chart illustrating an embodiment of a process of formatting the system of FIG. 1 for mirroring without duplicity.

FIG. 2 illustrates a process of preparing the system 10 for mirroring without duplicity according to an embodiment of the present invention. The process begins at block 32, where the first location 14 and/or its driver is formatted for mirroring. For example, in a Linux implementation where the first location comprises a disk drive, a single partition for RAID usage is made. In another embodiment, the first location stores an operating system. In this embodiment, one example implementation to format the first location for mirroring in Linux is to create a partition for RAID mirroring, run "mkinitrd" from the command line, edit the /etc/lilo.conf file by adding the line "initrd=/boot/initrd" for the ramdisk, and update the boot loader by running /sbin/lilo.

After the first location 14 is prepared for mirroring, the process continues at block 34, where the configuration file 28 is edited in one embodiment. It is noted that other types of files, registries, particular instantiations of a software RAID (or other) controller, or other such components may be edited in another embodiment. The configuration file 28 is edited to indicate the presence or existence of the first location 14 and the N−1 null locations that are parts of the N number of mirrors 30. For example, in a Linux implementation where the first location comprises a disk drive, a software RAID daemon configuration file, /etc/raid.conf, is edited to use the /dev/null drivers and the one disk device driver. In another embodiment, the configuration file is edited to use the null drivers and one operating system.

After the configuration file 28 is edited, the process continues to block 36, where a controller (e.g., the array device driver 12) is started. For example, in a Linux implementation, the software RAID controller is started with the command "mdstart."

After the controller is started, the process continues to block 38, where the array is formatted. The array may be analogously thought of as "mailboxes" of mirroring locations. The array contains pointers to each of the locations used in the mirrors, including the N−1 null locations and first location 14. In an example implementation, a RAID 1 array is formatted using the configuration file 28 and contains pointers to the first disk driver and the N−1 null device drivers. In another embodiment, the array contains pointers to one operating system and N−1 null drivers.

Figure 3:
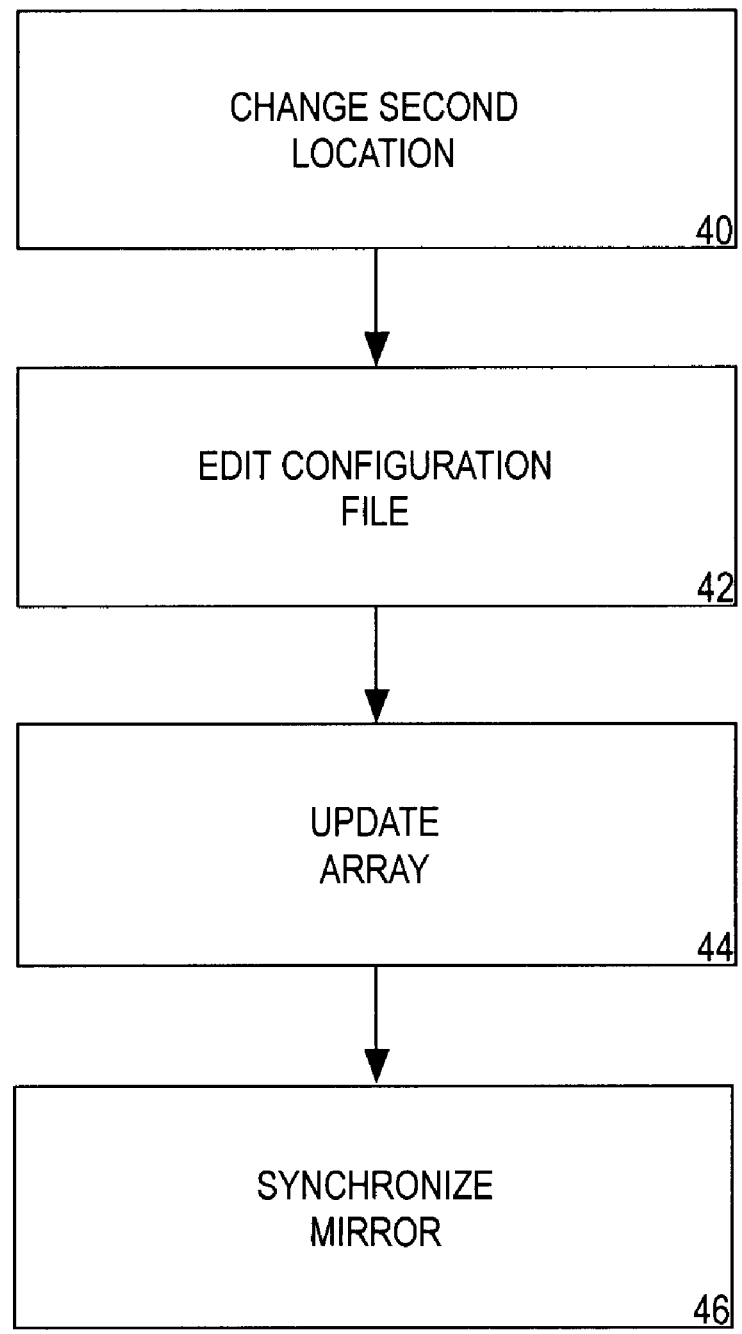
FIG. 3 is a flow chart illustrating an embodiment of a process of changing a location in the system of FIG. 1 for mirroring with duplicity.

FIG. 3 illustrates an embodiment of a process of configuring the system 10 for mirroring with duplicity, such as when a second disk drive is added to replace the null drive in whole or in part. The process begins in block 40, where the second location 16 is changed. One of the null locations is replaced with a new second location. In an example implementation, a second disk drive and/or its driver is formatted for mirroring and then used to replace one of the N−1 null device drives as part of the mirror. In another embodiment, a second operating system and/or a related component is formatted for mirroring and then used to replace one of the N−1 null device drives as part of the mirror.

After the second location 16 is changed, the process continues to block 42, where the configuration file 28 is edited. The configuration file 28 is edited to indicate the presence of the new second location by replacing one of the N−1 null locations with the new second location of the added second disk drive. For example, in a Linux implementation, the software RAID daemon configuration file, /etc/raid.conf, is edited to replace one of the N−1 null drivers with the new second disk driver.

In another embodiment, the configuration file is edited to replace one of the N−1 null drivers with a second operating system. In an embodiment, the second operating system may be stored in the second disk drive along with other data in the second disk drive. This allows the second operating system to act as the primary operating system if the first operating system fails or is inoperative. Also in operating environments where some configuration files refer to specific disk partitions, such as /dev/hda4 in Linux, such configuration files are changed at the block 42 to reference the second disk drive at /dev/hdc4, for example. When the system 10 is set up to always use mirroring, configuration files reference the mirroring device (e.g., the array device driver 12) at /dev/md0, for example, while a few configuration files are adjusted/changed in order to replicate the partitions from /dev/hda4 to/dev/hdc4. When the system 10 boots off the second disk drive, the system 10 automatically sets up the mirroring group (e.g., /dev/md0) so that this group contains the partition from the second disk drive (e.g., /dev/hdc4) and the null location (e.g., /dev/null).

After the configuration file 28 is edited, the process continues to block 44, where the array is updated. The array is updated by changing one of the pointers to the N−1 null locations to point to the new second location of the added second drive. The array may be updated by scanning the new configuration file 28. For example, in a Linux implementation, the new configuration file 28 is scanned, and the array updated by using the command "mdhotadd."

After the array is updated, the process continues to block 46, where the mirror is synchronized by sending data, instructions, or other information from the first location 14 to the second location 16, in a manner known by those skilled in the art having the benefit of this disclosure.

Figure 4:
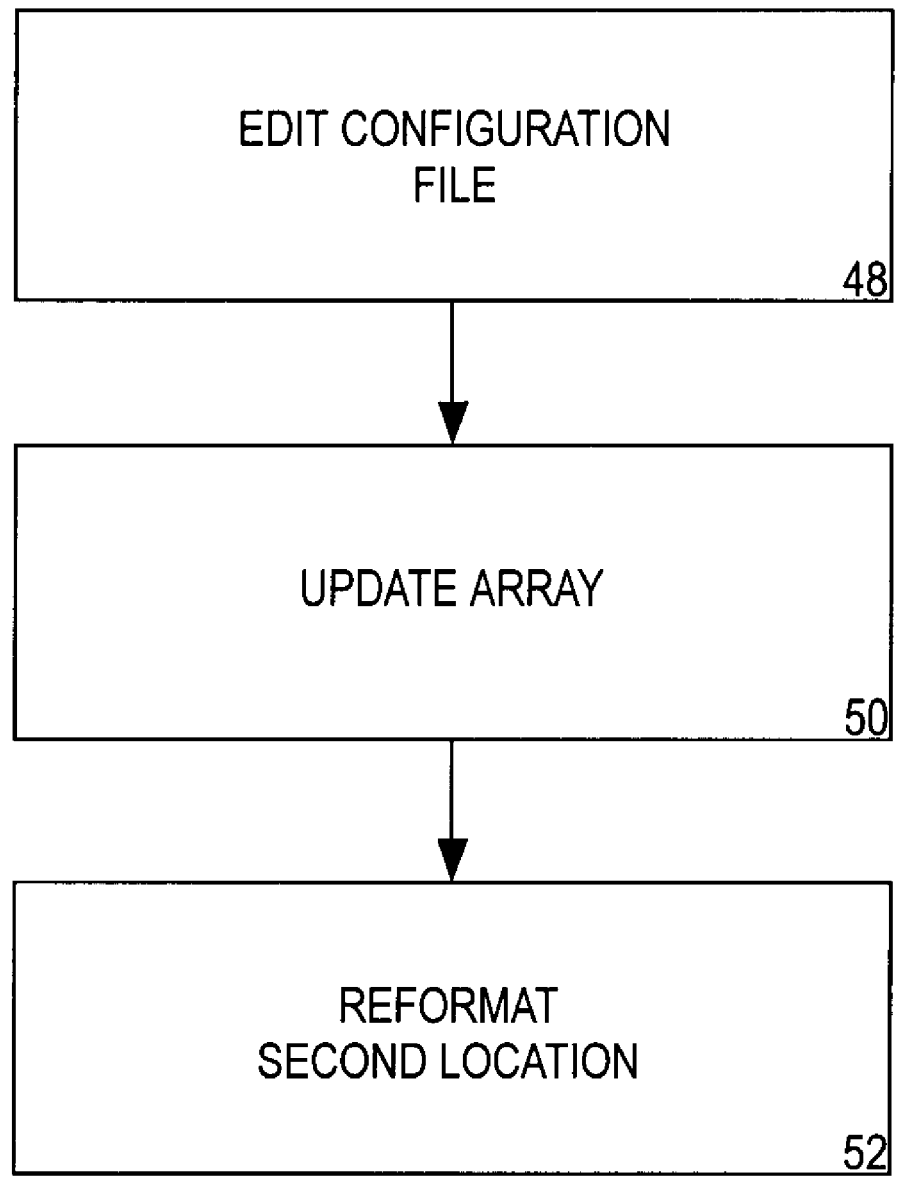
FIG. 4 is a flow chart illustrating an embodiment of a process of changing the system of FIG. 1 back to mirroring without duplicity.

FIG. 4 illustrates an embodiment of a process of configuring the system back to mirroring without duplicity. For example, this may happen when a user wants to use the second location for additional storage space instead of using it to duplicate data. This process begins at block 48, where the configuration file 28 is edited to replace the second location with the null location. For example, in a Linux implementation where the second location is a second disk drive, the software RAID daemon configuration file, /etc/raid.conf, is edited to replace the second disk driver with the null driver. In another embodiment, the configuration file is edited to replace the second operating system with the null driver.

After the configuration file 28 is edited, the process continues to block 50, where the array is updated. The array is updated by changing the pointer to the second location to point to the null location. The array may be updated by scanning the new configuration file 28. For example, in a Linux implementation, the new configuration file is scanned and the array is updated by using the command "mdhotadd."

After the array is updated, the second location can be reformatted for standalone use. For example, a second disk drive may be reformatted and then added into the system for additional storage, in a manner known by those skilled in the art of having the benefit of this disclosure.

In conclusion, embodiments of the invention simplify the switching between mirrored and non-mirrored modes. A system is provided with what appears to the user as a mirror, when in actuality, there may be only one storage location as a first part of the mirror and a null location as a second part of the mirror. Rather than acting as a true mirrored storage location, the null location acts as a placeholder for one or more additional storage locations. When actual mirroring mode is desired, the null location is replaced in whole or in part by the additional storage location(s), by changing pointers, for example. In this manner, the ability to switch to mirrored mode (or vice versa) appears transparent or dynamic to a user.

In an embodiment where operating systems are mirrored, the embodiment advantageously allows the system 10 to "boot off" of one of the drives if another drive that was being originally used to boot off of fails or becomes inoperable. The switching to this "backup" drive (or the configuring of the system 10 to have the ability to do so) in such a situation may involve editing or updating a RAID array or a RAID handler, for example, without having to make any substantive changes in the operating system configuration.

The above description of illustrated, embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, although embodiments of the invention describe the editing of configuration files when formatting the system 10 for mirroring and non-mirroring operations, it is to be appreciated that this is for illustrative purposes only. That is, in some other types of systems, environments, or devices, files other than configuration files may be edited in a manner consistent with principles of the invention.

Additionally, while only two disk drives and/or two operating systems are described in the embodiments herein, it is clear that principles of the invention may be applied to any suitable number of disk drives or operating systems in the system 10. For instance, embodiments of the invention can be applied to groups of drives or network storage units, and hence, the term "drive" as used herein is not necessarily limited to individual drives that may be coupled to a computer or to a network, for example.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
designating a first drive as a first part of a mirror;
designating a null drive to simulate a second part of the mirror to fake mirroring between the first part and the second part of the mirror, the null drive to act as a placeholder for a second drive wherein no data is actually written to nor read from the null drive; and
subsequently replacing the null drive with the second drive as the second part of the mirror to provide actual mirroring.

2. The method of claim 1 wherein subsequently replacing the null drive with the second drive as the second part of the mirror comprises:

designating the second drive for mirrored mode; and sending data from the first drive to the formatted second drive for mirror synchronization.

3. The method of claim 1 wherein the mirror comprises a plurality of N mirrors and wherein the null drive comprises a plurality of N−1 null drives, the method further comprising:

editing a file to indicate presence of the N−1 null drives and presence of the first drive; and formatting an array to provide pointers pointing to the N−1 null drives as the second part of the mirror.

4. The method of claim 3 wherein subsequently replacing the null drive with the second drive as the second part of the mirror comprises:

editing the file to indicate presence of the second drive by replacing one of the N−1null drives with the second drive; and updating the array to change one of the pointers pointing to the N−1 null drives to point to the second drive.

5. The method of claim 4 wherein the file comprises a redundant array of independent disks (RAID) configuration file and wherein the array comprises a RAID array.

6. The method of claim 2, further comprising replacing the second drive with the null drive as the second part of the mirror to return to standalone mode.

7. The method of claim 6 wherein replacing the second drive comprises:

editing the file to indicate a replacement of the second drive with the null drive;

updating the array to change a pointer pointing to the second drive to point to the null drive; and designating the second drive for standalone mode.

8. The method of claim 1 wherein the first drive includes a first operating system and wherein the second drive includes a second operating system.

9. A machine-readable medium having stored thereon instructions, which if executed by a processor, cause the processor to effect operations comprising:

designate a first drive as a first part of a mirror;

designate a null drive to simulate a second part of the mirror to fake mirroring between the first part and the second part of the mirror, the null drive to act as a placeholder for a second drive wherein no data is actually written to nor read from the null drive; and subsequently replace the null drive with the second drive as the second part of the mirror to provide actual mirroring.

10. The machine-readable medium of claim 9 wherein the mirror comprises a plurality of N mirrors and wherein the null drive comprises a plurality of N−1 null drives, wherein the instructions further cause the processor to effect operations comprising:

edit a component to indicate presence of the N−1 null drives and presence of the first drive; and format an array to provide pointers pointing to the N−1 null drives as the second part of the mirror.

11. The machine-readable medium of claim 10 wherein the instructions further cause the processor to effect operations comprising:

edit the component to indicate presence of the second drive by replacing one of the N−1 null drives with the second drive in the component; and update the array to change one of the pointers pointing to the N−1 null drives to point to the second drive.

12. The machine-readable medium of claim 9 wherein the instructions further cause the processor to effect operations comprising:

replace the second drive with the null drive as the second part of the mirror to return to standalone mode.

13. The machine-readable medium of claim 9 wherein the first drive includes a first operating system and wherein the second drive includes a second operating system.

14. An apparatus, comprising:

a first storage location designated to be a first part of a mirror; and a null location designated to simulate a second part of the mirror to fake mirroring between the first part and the second part of the mirror, the null drive to act as a placeholder for a second storage location wherein no data is actually written to nor read from the null location, the second storage location to subsequently replace the null location as the second part of the mirror to provide actual mirroring.

15. The apparatus of claim 14 wherein the mirror comprises a plurality of N mirrors and wherein the null location comprises a plurality of N−1 null locations, the apparatus further comprising:

a file to indicate presence of the N−1 null locations and presence of the first storage location; and an array to provide pointers pointing to the N−1 null locations as the second part of the mirror.

16. The apparatus of claim 15 wherein the first storage location includes a first operating system and wherein the second storage location includes a second operating system.

17. The apparatus of claim 15 wherein the file comprises a redundant array of independent disks (RAID) configuration file and wherein the array comprises a RAID array.

18. The apparatus of claim 14, further comprising:

a first operating system designated as a portion of the first part of the mirror; and a second operating system designated as a portion of the second part of the mirror to allow, during inoperability of the first operating system as a primary operating system, the second operating system to be used as the primary operating system.

19. A method, comprising:

designating a first operating system for a first part of a mirror;

designating a second operating system for a second part of the mirror;

using the second operating system as a primary operating system if the first operating system becomes unuseable as the primary operating system; and replacing the second part of the mirror with a null drive to fake mirroring between the first part and the second part of the mirror to provide a non-mirrored operating system mode.

20. The method of claim 19, further comprising designating the null drive to simulate a portion of another mirror to allow, during mirrored mode, the null drive to be replaced by a disk drive as the portion of the another mirror.

21. A machine-readable medium having stored thereon instructions, which if executed by a processor, cause the processor to effect operations comprising:

designate a first operating system for a first part of a mirror;

designate a second operating system for a second part of the mirror;

use the second operating system as a primary operating system if the first operating system becomes unusable as the primary operating system; and replacing the second part of the mirror with a null drive to fake mirroring between the first part and the second part of the mirror to provide a non-mirrored operating system mode.

22. The machine-readable medium of claim 21, wherein the instructions further cause the processor to effect operations comprising:

designate the null drive to simulate a portion of another mirror to allow, during mirrored mode, the null drive to be replaced by a disk drive as part of the second mirror.

23. A system, comprising:

a driver;

a processing unit coupled to the driver; and a storage medium coupled to the processing unit, the storage medium storing code, implementable by the processing unit to:

designate a first drive as a first part of a mirror controlled by the driver;

designate a null drive to simulate a second part of the mirror to fake mirroring between the first part and the second part of the mirror, the null drive to act as a placeholder for a second drive wherein no data is actually written to nor read from the null drive; and subsequently replace the null drive with the second drive as the second part of the mirror to provide actual mirroring.

24. The system of claim 23 wherein the mirror comprises a plurality of N mirrors and wherein the null drive comprises a plurality of M null drives, wherein M comprises a number between N and 0, non-inclusive, the system further comprising:

a file to indicate presence of the M null drives and presence of the first drive; and an array to provide pointers pointing to the M null drives as the second part of the mirror.

25. The system of claim 24 wherein the file comprises a redundant array of independent disks (RAID) configuration file and wherein the array comprises a RAID array.

* * * * *